Aug. 8, 1939.　　　L. W. CHUBB　　　2,169,022
DISPLAY DEVICE
Filed June 2, 1937　　　3 Sheets-Sheet 1
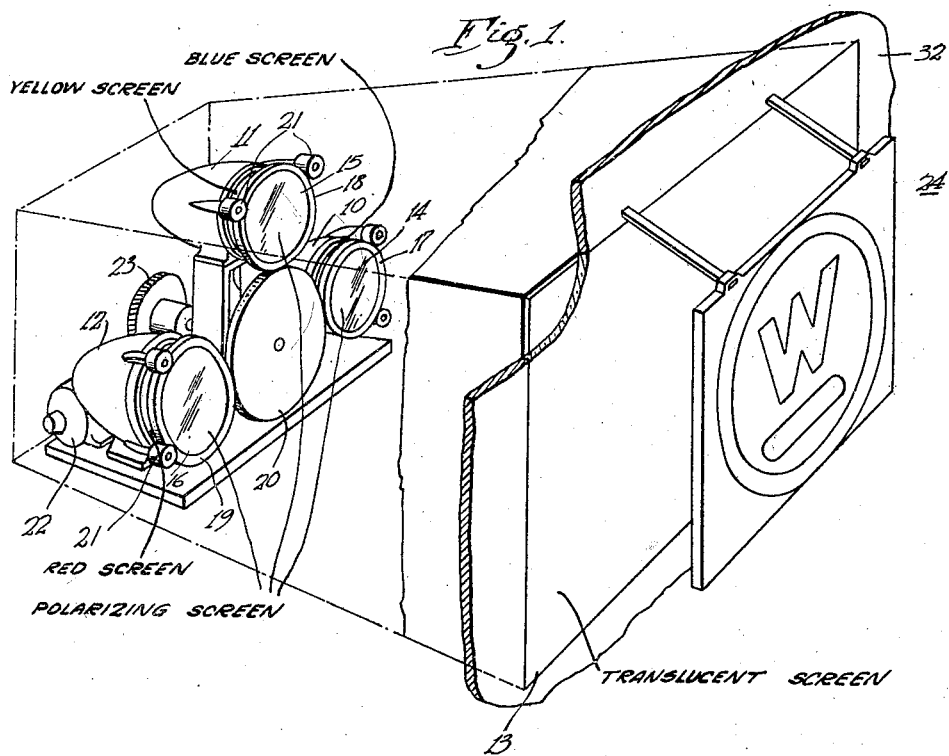
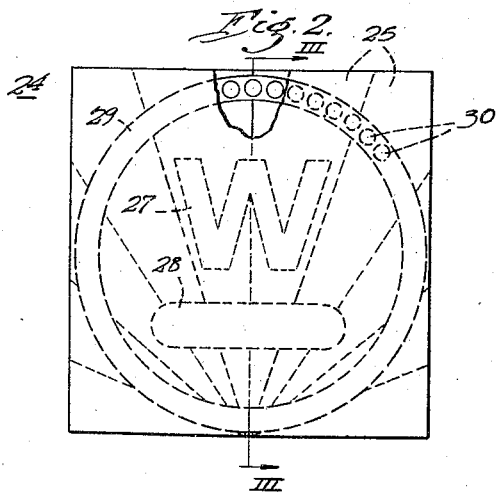
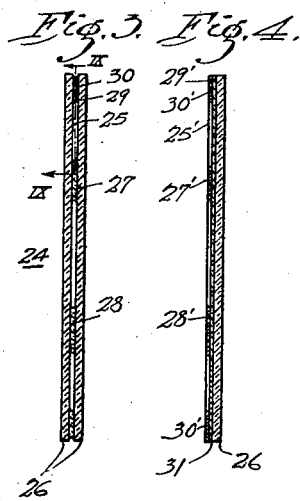
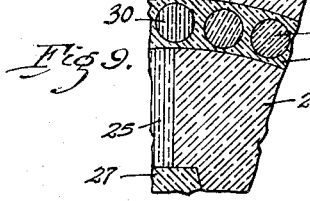
WITNESSES:
E. C. Leiding.
Joe Weber
INVENTOR
Lewis W. Chubb.
BY
[signature]
ATTORNEY Aug. 8, 1939.    L. W. CHUBB    2,169,022
DISPLAY DEVICE
Filed June 2, 1937    3 Sheets-Sheet 2
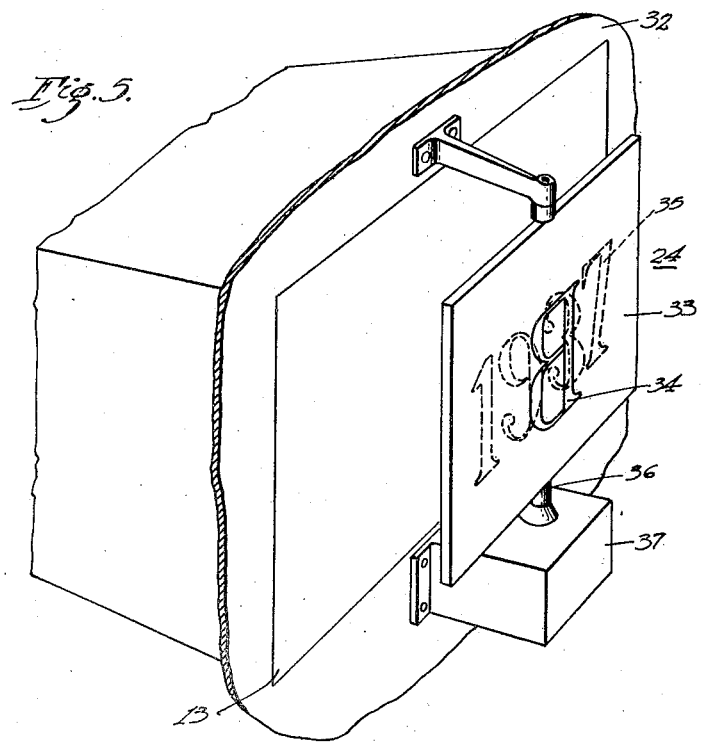
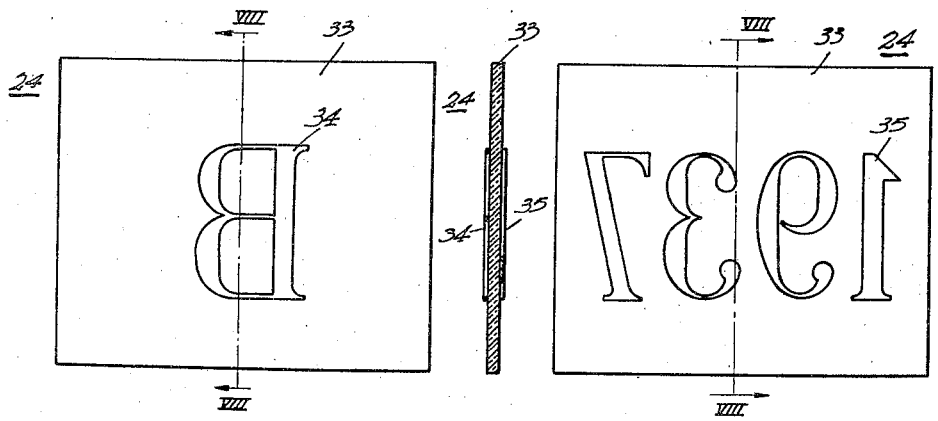
WITNESSES:    INVENTOR
    Lewis W. Chubb.
    BY
    ATTORNEY

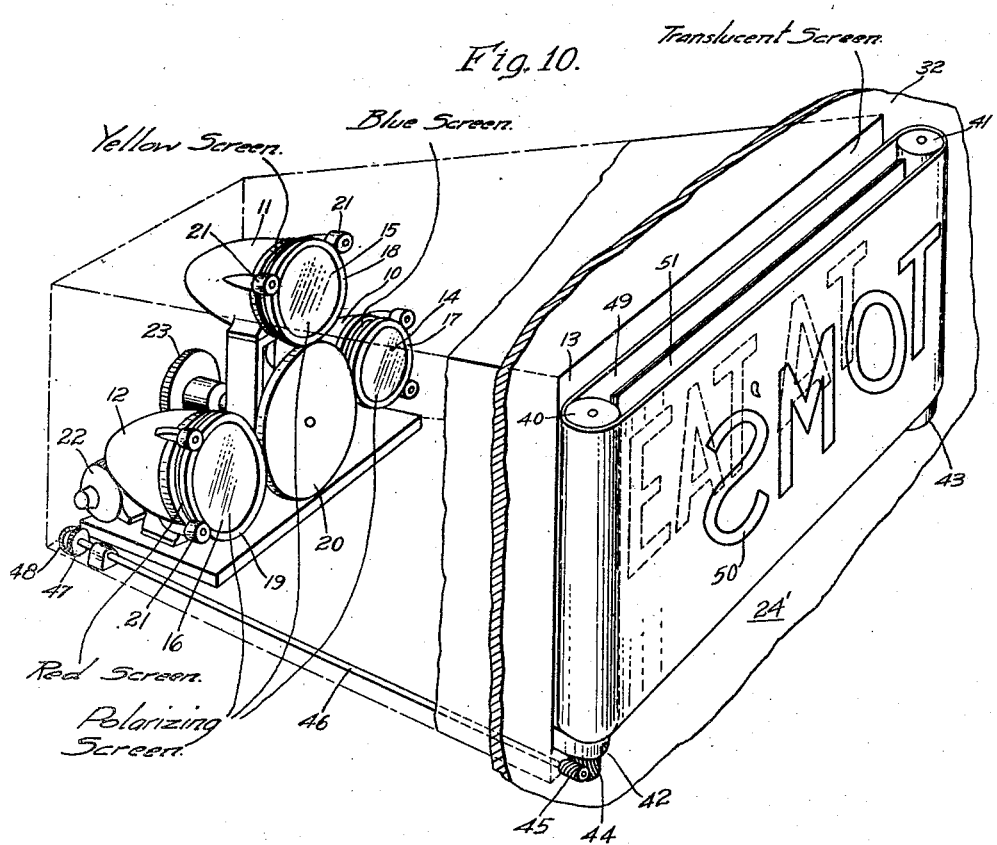

Patented Aug. 8, 1939

2,169,022

UNITED STATES PATENT OFFICE 2,169,022

DISPLAY DEVICE

Lewis W. Chubb, Pittsburgh, Pa., assignor to Westinghouse Electric & Manufacturing Company, East Pittsburgh, Pa., a corporation of Pennsylvania Application June 2, 1937, Serial No. 145,945

18 Claims. (Cl. 40—130)

My invention relates, generally, to display devices and, more particularly, to advertising display devices employing changing colors.

An object of my invention is to provide an advertising display device in which colors are continuously changing and shifting to present an attractive and spectacular display.

Another object of the invention is to provide an advertising display device in which a plurality of light beams of different colors are combined and varied in intensity to produce a variety of color effects.

A further object of the invention is to provide an advertising display device in which a plurality of color beams of polarized light are so combined as to produce a variety of color effects.

Another object of the invention is to provide a display device in which a plurality of polarized light beams of supplementary colors are combined to produce a beam of substantially white light which is projected upon a display device made up of a plurality of areas having differing polarizing axes and in which there is relative shifting of the polarizing axis of the colored beams and the polarizing areas of the display device.

These and other objects of the invention will be apparent from the following detailed description taken in connection with the accompanying drawings, in which:

Figure 1 is a perspective view of a preferred embodiment of my invention, showing the display element as it appears to an observer.

Fig. 2 is a front elevation view of the display member of the device shown in Fig. 1, Fig. 3 is a sectional view taken along the line III—III of Fig. 2, Fig. 4 is a sectional view of a modification of the display member shown in Fig. 1, Fig. 5 is a perspective view of part of the apparatus shown in Fig. 1, showing another modification of the display member, Fig. 6 is an elevational view of one side of the display member shown in Fig. 5, Fig. 7 is an elevational view of the other side of the display member shown in Fig. 5, Fig. 8 is a sectional view of the display member shown in Figs. 6 and 7 taken on the section lines VIII—VIII thereof, Fig. 9 is an enlarged sectional view taken along the lines IX—IX of Fig. 3, and Fig. 10 is a perspective view of another embodiment of my invention.

In practicing my invention, I provide a translucent screen which will not depolarize light and project a plurality of beams of differently colored light upon said screen after passing the light through polarizing screens which are rotating at different speeds to continually shift the azimuths of the planes of polarization. In one form of the invention, I provide a display element through which the translucent screen may be viewed and which is made up of a plurality of segments of light polarizing material with the planes of polarization of the segments disposed at different azimuths.

In another form of the invention, a display element is provided which comprises a light polarizing element with figures or characters of a bi-refringent material, such as "Cellophane", disposed between the translucent screen and the light polarizing element. In another modification such characters are placed on opposite sides of a light polarizing element so that when the translucent screen is viewed through the polarizing screen only the characters on the polarizing screen which lie between the polarizing screen and the translucent screen will be visible. Mechanism is provided in this modification to position first one side and then the other of the display member toward the translucent screen, so that the display characters on the opposite sides of the display member will become visible alternately.

Referring to Fig. 1, a plurality of light projectors 10, 11 and 12 are provided for projecting light upon a translucent screen 13. The light projected by each of these projectors is preferably of a different color and the colors are preferably supplementary, such are red, yellow and blue and the beam from each of these projectors is made to cover the entire surface of the translucent screen 13, so that the blending of the colors will cause substantially white light to be transmitted through the translucent screen and will make it appear that the screen is illuminated with a steady beam of substantially white light.

Light polarizing elements 14, 15 and 16 are positioned between the projectors 10, 11 and 12 and the translucent screen 13, so that each of the beams may be polarized as it strikes the screen 13. The polarizing elements 14, 15 and 16 may be mounted on rings 17, 18 and 19 which are of different diameters and may be driven in any suitable manner such as by a drive wheel 20, the periphery of which engages the rings as shown.

Rings 17, 18 and 19 are held in engagement with the wheel 20 by roller members 21 and the wheel 20 may be continuously driven by a motor 22 through a gear mechanism 23 as shown.

With the ring members 17, 18 and 19 of different diameters simultaneously rotated by the wheel 20, different speeds of rotation will be imparted to the rings and the polarizing elements carried thereby and the azimuths of the planes of polarization of the three beams projecting upon the translucent screen 13 will be continuously changing. Any other suitable means for rotating the polarizing screens at different speeds may be provided.

The display member 24 is suspended in front of the translucent screen 13 by any suitable means in a position such as to enable an observer to view the translucent screen through the display member.

The display member 24 may comprise a background made up of several sections 25 in any suitable design, these sections to be made of light polarizing material mounted upon a suitable transparent support such as a sheet of glass 26, shown in Fig. 3. These sections of polarizing material which make up the background have their planes of polarization in different azimuths.

Display characters 27, 28 and 29 are disposed upon this background and are preferably constructed by cutting the display characters from the background and filling in the space left by these cut-out portions with a light polarizing material similar to that of the sections 25 with the planes of polarization of the display characters 27, 28 and 29 parallel and preferably at a different azimuth from the azimuths of the planes of polarization of the several sections 25.

As a further display attraction, portions 30 may be cut from the display character 29 or any of the other display characters and the azimuths of the planes of polarization of these elements 30 shifted with respect to the azimuth of the plane of polarization of the character 29, the azimuths of the planes of polarization of the elements 30 progressively changing around the circle character 29. The relation of the planes of polarization of the several polarizing segments is shown by the direction of the cross hatching of these members in Fig. 9.

In the modification of the display element shown in section in Fig. 4, a sheet of glass 26 has disposed upon it a sheet of light polarizing material 31 and upon this there are disposed the sections 25', 27', 28', 29', 30' corresponding to the elements 25, 27, 28, 29 and 30 of Figs. 2 and 3. In this modification, however, the segments 25' and the display character elements 27', 28', 29' and 30' are made of bi-refringent material and have their azimuths disposed at various angles as explained hereinbefore in connection with the corresponding elements of Figs. 2 and 3.

In the operation of the device of Figs. 1, 2 and 3, it will be seen that the translucent screen 13 will have projected upon it three supplementarily colored beams of polarized light with the azimuths of the planes of polarization of these beams continually changing with respect to each other. The translucent screen will transmit substantially white light which will be made up of the three beams projected upon it and each of which will usually have a different plane of polarization for each of the components of the white light which it transmits, and the azimuths of these planes of polarization will be continually changing with respect to each other. As an observer views the translucent screen 13 through the display element 24, each of the sections 25 and 30 will have a different color and each of these colors will be continually changing, the sections 27, 28 and 29 will have the same colors, which color will be continually changing and which color will always differ from the colors of the segments 25 and 30, so that the display characters will stand out prominently from the background which is made up of segments 25.

The changing color in each of the segments of the display device is produced by the ever-changing components of the three colors transmitted by the translucent screen in the plane of polarization of each of the segments 25.

The difference in color in the several sections of the background and the display characters results from the fact that the planes of polarization of these different segments have different azimuths or angular displacements, and the components of the three beams transmitted by the translucent screen 13 in planes of different azimuths will be such as to produce different colors in these different planes.

When the display device of Fig. 4 is used, it is so disposed as to cause the segments 25', 27', 28', 29' and 30' to lie between the polarizing element 31 and the translucent screen 13. With the screen of Fig. 4 so disposed and with the white light transmitted by a translucent screen 13 made up of three supplementarily colored polarized beams with continuously changing azimuths, the display effect will be very much the same as that produced by the display member shown in Figs. 2 and 3. The birefringent material from which the sections of background and display characters are made has two planes of polarization substantially normal to each other and will transmit light vibrating in one of these planes which is relatively retarded over that transmitted in the other plane. Thus, it will be seen that the components of the three polarized supplementarily colored beams striking this bi-refringent material will be split up into a summation of these components in planes parallel and perpendicular to the optical axis of the bi-refringent material and they will emerge substantially plane polarized with a shift in their azimuths depending upon the azimuth of incidence; it will be seen that because of this shift in plane of polarization in passing through the bi-refringent material different color components will pass on through the polarizing layer 31.

Thus the segments 25' and 30' will have different colors, which colors are continuously changing and which colors will always differ from the color of segments 27', 28' and 29', which color is also continuously changing. With the azimuths of the planes of polarization of the segments 30 progressively displaced about the circle 29, it will be seen that the shades of color will move along this row of segments 30.

In a practical application of the display device, it is desirable that the translucent screen 13 be made to fill an opening in a curtain or screen 32 and that the apparatus for producing the white light transmitted by the translucent screen be placed behind the curtain 32, so that it will appear to an observer of the display device that it is merely being illuminated by simple white light from the translucent screen 13. With this arrangement the continuously changing varicolored effects observed will be very bewildering and mystifying to the observer.

In the modification of the device shown in Figs. 5 to 8, the display device comprises a light polarizing element 33, on one side of which there is disposed a display character 34 and on the other side of which there is disposed a display character 35, these display characters preferably being different and being made of bi-refringent material. With this arrangement when the display device 24 is so disposed that the display character 35 is positioned between the polarizing screen 33 and the translucent screen 13, the display character 35 will have a color different from the background of color transmitted by the polarizing screen 33 and the colors transmitted by this display character 35 and the polarizing screen 33 will be continuously changing for the reasons hereinbefore explained in connection with the description of the modification of Fig. 4.

While the character 35 is so disposed, the character 34 will lie between the observer and the polarizing screen and this character 34 will not be visible, since it will transmit to the observer the light which is transmitted to it from the polarizing screen 33.

If now the display element 24 is reversed so that the display character 344 lies between the polarizing screen 33 and the translucent screen 13, the display character 35 will lie between the observer and the polarizing screen 33 and will not be visible while the display character 34 will be visible and will have a color differing from that of the polarizing screen 33, and these colors will be continuously changing for the reason hereinbefore discussed.

The display element may be mounted to rotate on a shaft 36 and a mechanism such as a Geneva movement may be provided in the casing 37 for intermittently reversing the position of the display element 24, so that first one and then the other of the display characters 34 and 35 will be visible to an observer. This mechanism for moving the display element 24 may be driven by any suitable mechanism, not shown, and which may, in turn, be driven by the continuously rotating motor 22 discussed in connection with the description of the apparatus of Fig. 1.

Any arrangement of these elements which will secure an effect similar to that obtained by the device of Figs. 5 to 9 is within the scope of my invention. As an example of a device which might be used for this purpose, a band of transparent material might be mounted to pass belt fashion between spaced rotating spools in front of the translucent screen, a fixed light polarizing screen being mounted parallel with the translucent screen and between the spools. Then characters of bi-refringent material mounted on the belt would be visible while passing in one direction between the translucent screen and the light polarizing belt but would be invisible while passing in the opposite direction between the observer and the belt. Such an embodiment is shown in Fig. 10.

Referring to Fig. 10, the device is the same as that of Fig. 1 except that a display element 24' is substituted for the display element 24 of Fig. 1 and a mechanism is added to actuate the display element 24'. Like reference characters are applied to like parts in Figs. 1 and 10. A pair of spools 40 and 41 are mounted to rotate on vertical axes on suitable supporting brackets 42 and 43. The spool 40 is rotated by suitable gear members 44 and 45, a shaft 46 and suitable gear members 47 and 48, the gear member 48 being mechanically connected to be rotated by the motor by any well known means, not shown.

An endless band of transparent material is mounted to be moved belt-fashion about the spools 40 and 41 when the spool 40 is rotated by the motor 22. Display characters 50 of bi-refringent material are secured to the outer side of the transparent band 49. A light polarizing screen 51 is mounted in any suitable manner between the parallel sides of the band 49.

In the operation of the embodiment of Fig. 10, when the display characters 50 are positioned between the polarizing screen 51 and the translucent screen 13, the display characters will have a color different from the background of color transmitted by the polarizing screen 51, and the colors transmitted by the display characters 50 while in this position, and by the polarizing screen 51, will be continuously changing for the reasons hereinbefore explained in connection with the description of the modification of Fig. 4. While the polarizing screen 51 lies between the characters 50 and the translucent screen, they will not be visible since they will transmit to the observer the light which is transmitted to them by the polarizing screen.

It will be seen that I have provided an attractive display device which is characterized by the display of many continuously changing colors which is simple in operation and inexpensive of manufacture.

In compliance with the requirements of the patent statutes, I have shown and described herein preferred embodiments of my invention. It is understood, however, that the invention is not limited to the precise constructions shown and described but is capable of modification by one skilled in the art, the embodiments herein shown being merely illustrative of the principles of my invention.

I claim as my invention:

1. In an advertising device, means for producing a plurality of beams of differently colored polarized light, means for varying the relative angular displacements of the planes of polarization of the beams, and a display member comprising a light polarizing element positioned to permit the light from said beams to fall upon said display member.

2. In a light display device, a display member comprising a plurality of light polarizing elements having their planes of polarization disposed in various angular relations with each other, means for producing a plurality of beams of differently colored polarized light, and means for varying the relative angular displacements of the planes of polarization of the beams, said display member being so positioned as to permit the light from the beams to fall upon it.

3. In an advertising device, a means for producing a plurality of beams of differently colored polarized light, means for varying the relative angular displacements of the planes of polarization of the beams, and a display member comprising characters on a background made up of a plurality of light polarizing elements having their planes of polarization disposed in various angular relations with each other, said display member being so positioned as to permit the light from said beams to fall upon said display member.

4. In a display device, a translucent element, means for projecting a beam of polarized light upon said element, a display member comprising a light polarizing element disposed to receive light from said translucent element, and means for effecting relative rotation of the planes of polarization of said beam and said display member about an axis which is substantially parallel to said beam.

5. In a display device, a translucent element, means for projecting a plurality of differently colored beams of polarized light upon said translucent element, means for effecting relative rotation of the planes of polarization of said beams about axes which are substantially parallel to said beams, and a display member comprising a light polarizing element disposed to receive light from said translucent element.

6. In a light display device, a translucent element, means for projecting a plurality of differently colored beams of polarized light upon said translucent element, means for effecting relative rotation of the planes of polarization of said beams about axes which are substantially parallel with said beams, and a display member comprising a plurality of light polarizing elements having their planes of polarization disposed at various angles with each other, said display member being so disposed as to receive light from said translucent member.

7. In an advertising display device, a translucent element, means for projecting a plurality of differently colored beams of polarized light upon said translucent element, means for effecting relative rotation of the planes of polarization of said beams about axes which are substantially parallel with said beams, and a display member comprising characters and a background made up of a plurality of light polarizing elements having their planes of polarization disposed at various angles with each other, said display member being so disposed as to receive light from said translucent member.

8. In an advertising display device, a translucent screen, means for superposing upon said screen a plurality of polarized supplementarily colored light beams so that the screen may be illuminated by substantially white light, means for causing relative rotation of the planes of polarization of said beams about axes substantially parallel to said beams, and a display member comprising a plurality of light polarizing elements having their planes of polarization disposed at various angles and including characters having their planes of polarization parallel, said display member being so disposed as to be illuminated by light from said translucent screen.

9. In an advertising display device, a casing, a translucent screen mounted in one wall of said casing, means mounted in said casing for superposing supplementarily colored lights upon said screen, polarizing means disposed to polarize each of said colors of light, means mounted in said casing for causing rotation of the planes of polarization of said polarizing means at different speeds about axes which are substantially normal to said screen, and a display member comprising a plurality of light polarizing elements, said display member being so disposed as to be illuminated by light transmitted through said translucent screen.

10. In a display device, a translucent screen, means for superposing upon said screen a plurality of polarized supplementarily colored light beams so that the screen may be illuminated with substantially white light, means for causing relative rotation of the planes of polarization of said beams about axes substantially parallel to said beams, and a display member comprising a light polarizing screen and display characters of bi-refringent material disposed between said translucent screen and said light polarizing screen.

11. In an advertising device, means for producing a plurality of beams of differently colored polarized light, means for rotating the planes of polarization of said beams at different speeds about axes which are substantially parallel with the beams, a display member disposed to permit the light from said beams to fall upon it, said display member comprising a light polarizing screen and characters of bi-refringent material disposed on one side of said screen, and said bi-refringent material being disposed between said polarizing screen and the means for polarizing the individual beams.

12. In a display device, a translucent element, a plurality of light polarizing elements having their planes of polarization substantially normal to said translucent element, means for projecting lights of different colors through said polarizing elements upon said translucent element, means for varying the relative angular displacement of said planes of polarization, and a display element comprising a plurality of light polarizing segments having their planes of polarization disposed at various angles with one another and substantially normal to said translucent element, said display element being disposed so as to be illuminated from said translucent screen.

13. In an advertising display device, a display member comprising a light polarizing screen with display characters formed from bi-refringent material disposed on the two sides of said screen, means for producing a plurality of beams of differently colored polarized light, means for rotating the planes of polarization of said beams about axes which are substantially parallel with the beams, and means for so manipulating said display member as to cause one side and then the other side of said display member alternately to be exposed to the light from said beams.

14. In an advertising display device, a translucent screen, means for projecting upon said screen a plurality of supplementarily colored polarized lights, means for rotating the planes of polarization of each of said lights while maintaining the planes of polarization substantially normal to said translucent screen, a display member comprising a light polarizing member having display characters formed of bi-refringent material disposed on two sides thereof, the characters on one side differing from those on the other side, said display member being so disposed that said translucent screen may be viewed through the display screen, and means for alternately causing first one and then the other display character to be disposed between said light polarizing member and said translucent screen.

15. In a display device, a translucent screen, means for projecting polarized light upon said screen, a display device comprising a light polarizing screen having display characters formed of bi-refringent material on each side thereof, said display characters on one side of said light polarizing screen differing from those on the other side so that when the translucent screen is viewed through the polarizing screen from one side the display characters on the other side only will be visible and when the translucent screen is viewed through the polarizing screen from the other side the display characters on the one side only will be visible.

16. In an advertising display device, a translucent screen, means for projecting polarized light upon said screen, a plane polarizing screen, a display character of bi-refringent material, and means for causing said display character to be disposed alternately between said translucent screen and said polarizing screen and between said polarizing screen and an observer.

17. In a display device, a display member comprising a plurality of sections of polarized material having their planes of polarization disposed at various angles with one another, means for producing a plurality of beams of differently colored polarized lights having their planes of polarization disposed at various angles with one another, said display member being so positioned as to permit the light from said beams to fall upon it.

18. In an advertising display device, a translucent screen, means for projecting upon said screen a plurality of supplementarily colored polarized lights, means for rotating the planes of polarization of each of said lights while maintaining the planes of polarization substantially normal to said translucent screen, a display member comprising a light polarizing member positioned adjacent to and substantially parallel with said translucent screen, an endless band of transparent material placed around said light polarizing member and having display characters of bi-refringent material disposed on one side thereof, and means for causing said endless band to move around said light polarizing member.

LEWIS W. CHUBB.